US009403555B2

(12) United States Patent
Ueda et al.

(10) Patent No.: US 9,403,555 B2
(45) Date of Patent: Aug. 2, 2016

(54) DRIVING ROUTE GENERATION DEVICE

(71) Applicant: DENSO CORPORATION, Kariya, Aichi-pref. (JP)

(72) Inventors: Yusuke Ueda, Nishio (JP); Tomohiko Tsuruta, Aichi-ken (JP); Takeshi Hatoh, Nagoya (JP); Takayuki Kondoh, Kuwana (JP); Naoya Inoue, Aichi-ken (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 226 days.

(21) Appl. No.: 14/132,329

(22) Filed: Dec. 18, 2013

(65) Prior Publication Data

US 2014/0180569 A1   Jun. 26, 2014

(30) Foreign Application Priority Data

Dec. 21, 2012   (JP) ................... 2012-279593

(51) Int. Cl.
*B62D 15/00*   (2006.01)
*B62D 15/02*   (2006.01)
*B60W 30/165*   (2012.01)
*G08G 1/16*   (2006.01)
(Continued)

(52) U.S. Cl.
CPC ........... *B62D 15/025* (2013.01); *B60W 30/165* (2013.01); *B60K 2031/005* (2013.01); *B60W 2550/306* (2013.01); *B62D 15/026* (2013.01); *G08G 1/166* (2013.01); *G08G 1/167* (2013.01); *G08G 1/22* (2013.01)

(58) Field of Classification Search
CPC . B62D 15/025; B62D 15/026; B60W 30/165; G01C 21/00; G05D 1/0287; G08G 1/16; G08G 1/166; G08G 1/167; G08G 1/22
See application file for complete search history.

(56) References Cited

U.S. PATENT DOCUMENTS

| | | | | |
|---|---|---|---|---|
| 6,289,273 | B1 * | 9/2001 | Boettiger | B60K 31/0008 340/903 |
| 7,925,415 | B2 * | 4/2011 | Kudo | B62D 15/026 180/167 |
| 8,010,274 | B2 * | 8/2011 | Sawada | B60T 7/22 701/78 |

(Continued)

FOREIGN PATENT DOCUMENTS

| | | |
|---|---|---|
| JP | 2000-105900 | 4/2000 |
| JP | 2004-078333 | 3/2004 |

(Continued)

*Primary Examiner* — Helal A Algahaim
*Assistant Examiner* — Donald J Wallace
(74) *Attorney, Agent, or Firm* — Harness, Dickey & Pierce, P.L.C.

(57) ABSTRACT

A selection track setting section in a driving route generation device determines as a selected track a track of a preceding vehicle when a detection section and a track generation section detects a track of the preceding vehicle which is running on the same driving lane of a host vehicle. A candidate track selection section outputs as a candidate track one of tracks of front vehicles, detected by the detection section and the track generation section, other than the track of the preceding vehicle. A switching selection section switches as the selected track from the track of the preceding vehicle to the candidate track when a detection of the track of the preceding vehicle is interrupted during a predetermined detection period. An estimate route generation section generates an estimated driving route of the host vehicle on the bass of the selected track.

4 Claims, 13 Drawing Sheets

(51) Int. Cl.
*B60K 31/00* (2006.01)
*G08G 1/00* (2006.01)

(56) References Cited

U.S. PATENT DOCUMENTS

| | | | | | |
|---|---|---|---|---|---|
| 8,131,444 | B2 * | 3/2012 | Urban | | B60W 30/14 |
| | | | | | 340/903 |
| 9,091,558 | B2 * | 7/2015 | Su | | G01C 21/34 |
| 2002/0087255 | A1 * | 7/2002 | Jindo | | B60K 31/0008 |
| | | | | | 701/96 |
| 2002/0138193 | A1 * | 9/2002 | Miyahara | | B60K 31/0008 |
| | | | | | 701/96 |
| 2003/0217880 | A1 * | 11/2003 | Isogai | | B60K 31/0008 |
| | | | | | 180/170 |
| 2003/0218564 | A1 * | 11/2003 | Tamatsu | | G01S 7/414 |
| | | | | | 342/70 |
| 2003/0225519 | A1 * | 12/2003 | Miyahara | | B60K 31/0008 |
| | | | | | 701/301 |
| 2004/0149504 | A1 * | 8/2004 | Swoboda | | B60K 31/0008 |
| | | | | | 180/169 |
| 2005/0043879 | A1 * | 2/2005 | Desens | | B60K 31/0008 |
| | | | | | 701/96 |
| 2005/0102089 | A1 * | 5/2005 | Linden | | B60K 31/0008 |
| | | | | | 701/96 |
| 2008/0161986 | A1 * | 7/2008 | Breed | | G08G 1/161 |
| | | | | | 701/23 |
| 2009/0012703 | A1 * | 1/2009 | Aso | | B60W 30/10 |
| | | | | | 701/532 |
| 2009/0125204 | A1 * | 5/2009 | Kudo | | B62D 15/026 |
| | | | | | 701/96 |
| 2009/0192710 | A1 * | 7/2009 | Eidehall | | B62D 15/0265 |
| | | | | | 701/301 |
| 2009/0204304 | A1 * | 8/2009 | Urban | | B60W 40/04 |
| | | | | | 701/96 |
| 2010/0324797 | A1 * | 12/2010 | Fritz | | B62D 15/026 |
| | | | | | 701/96 |
| 2011/0106391 | A1 * | 5/2011 | Shida | | B60W 30/165 |
| | | | | | 701/96 |
| 2013/0231829 | A1 * | 9/2013 | Gerdt | | G05D 1/0061 |
| | | | | | 701/41 |
| 2014/0156164 | A1 * | 6/2014 | Schuberth | | B60W 30/143 |
| | | | | | 701/96 |

FOREIGN PATENT DOCUMENTS

| | | | | |
|---|---|---|---|---|
| JP | 2007-137248 | | 6/2007 | |
| JP | 2008-049918 | | 3/2008 | |
| SE | WO 2012050486 A1 * | 4/2012 | | G05D 1/0061 |

* cited by examiner

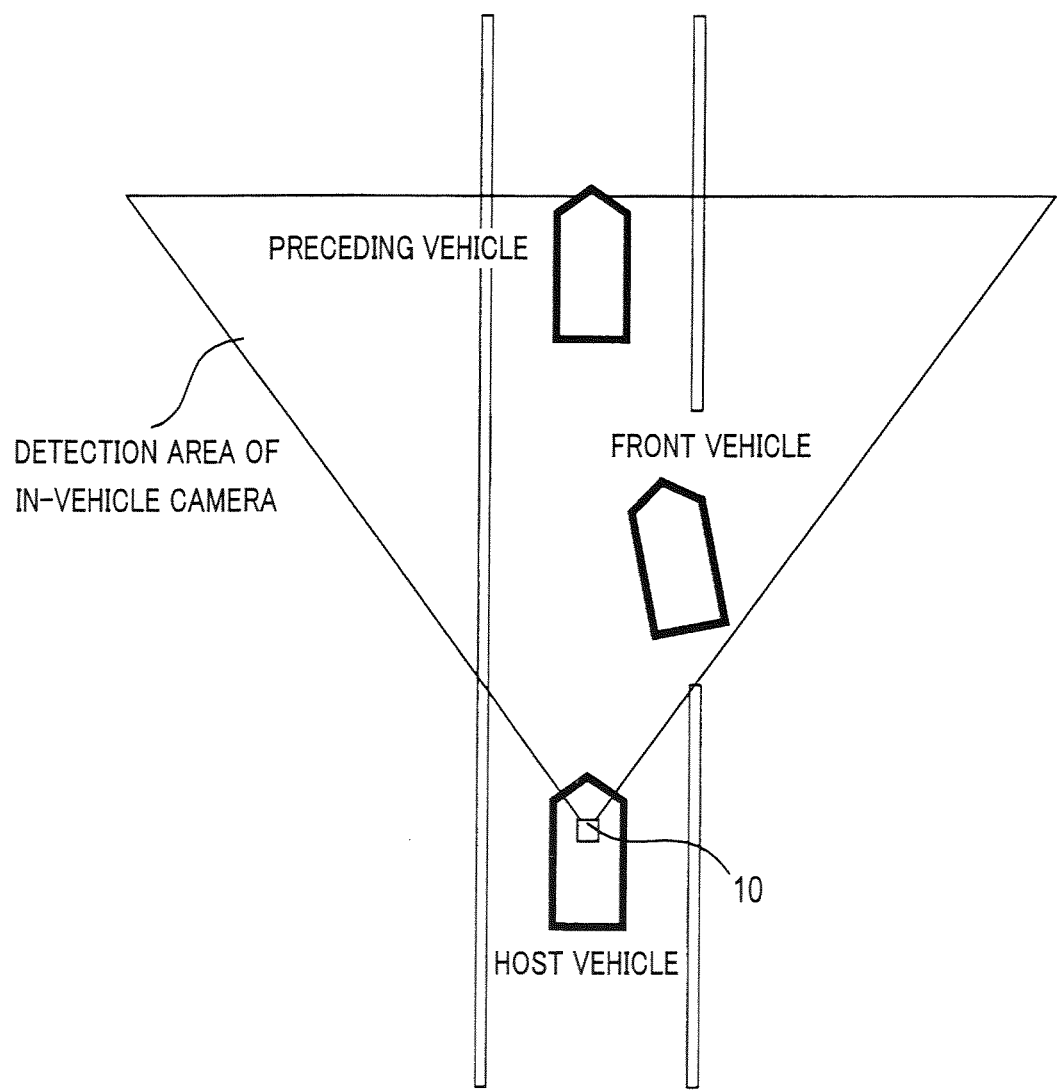

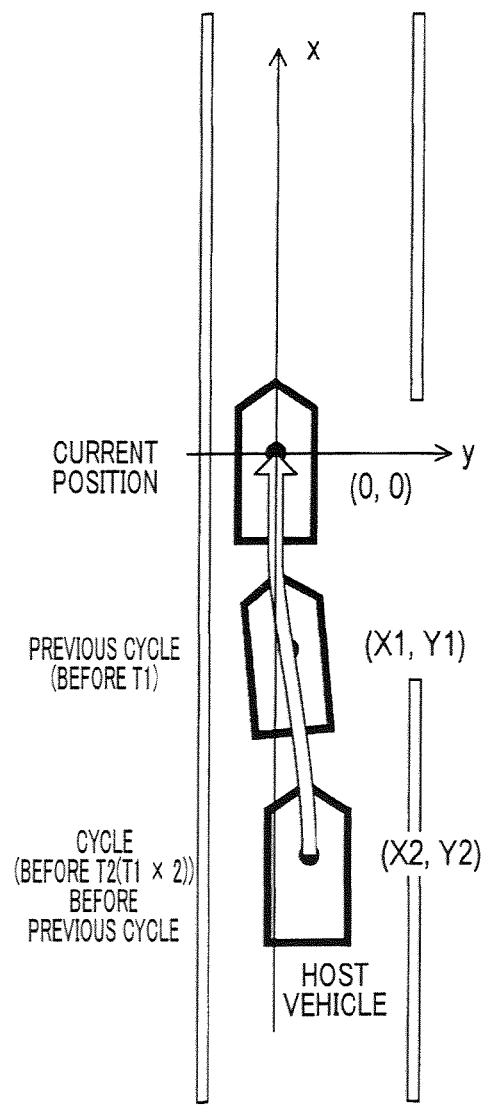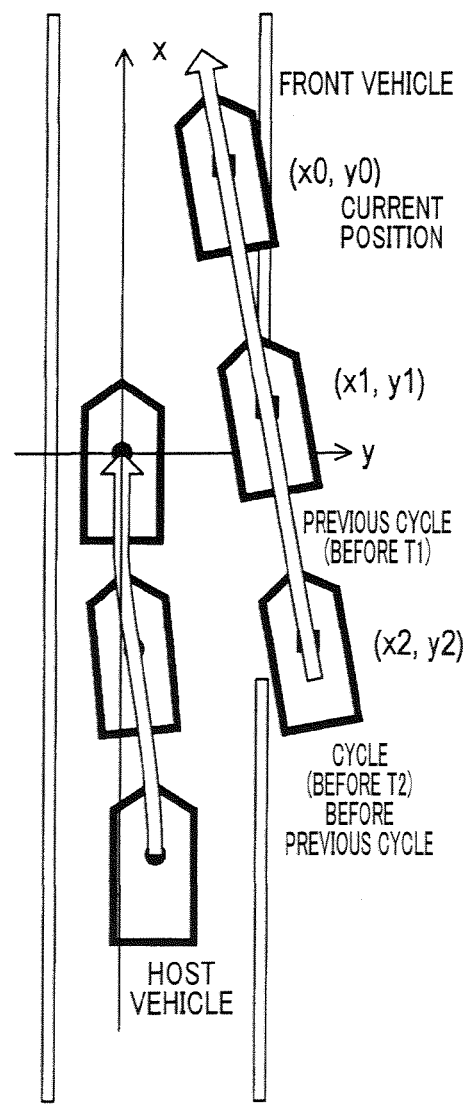

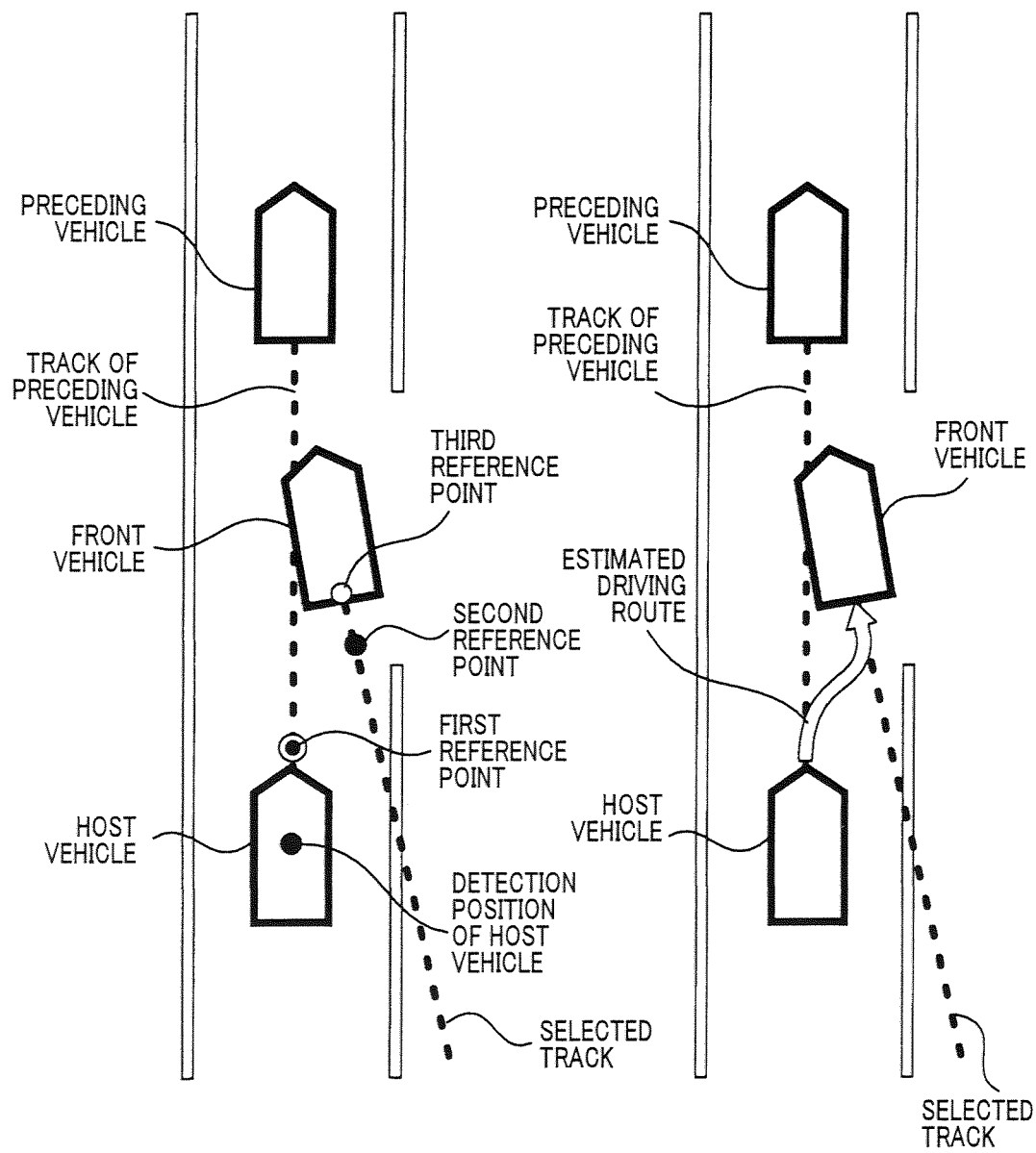

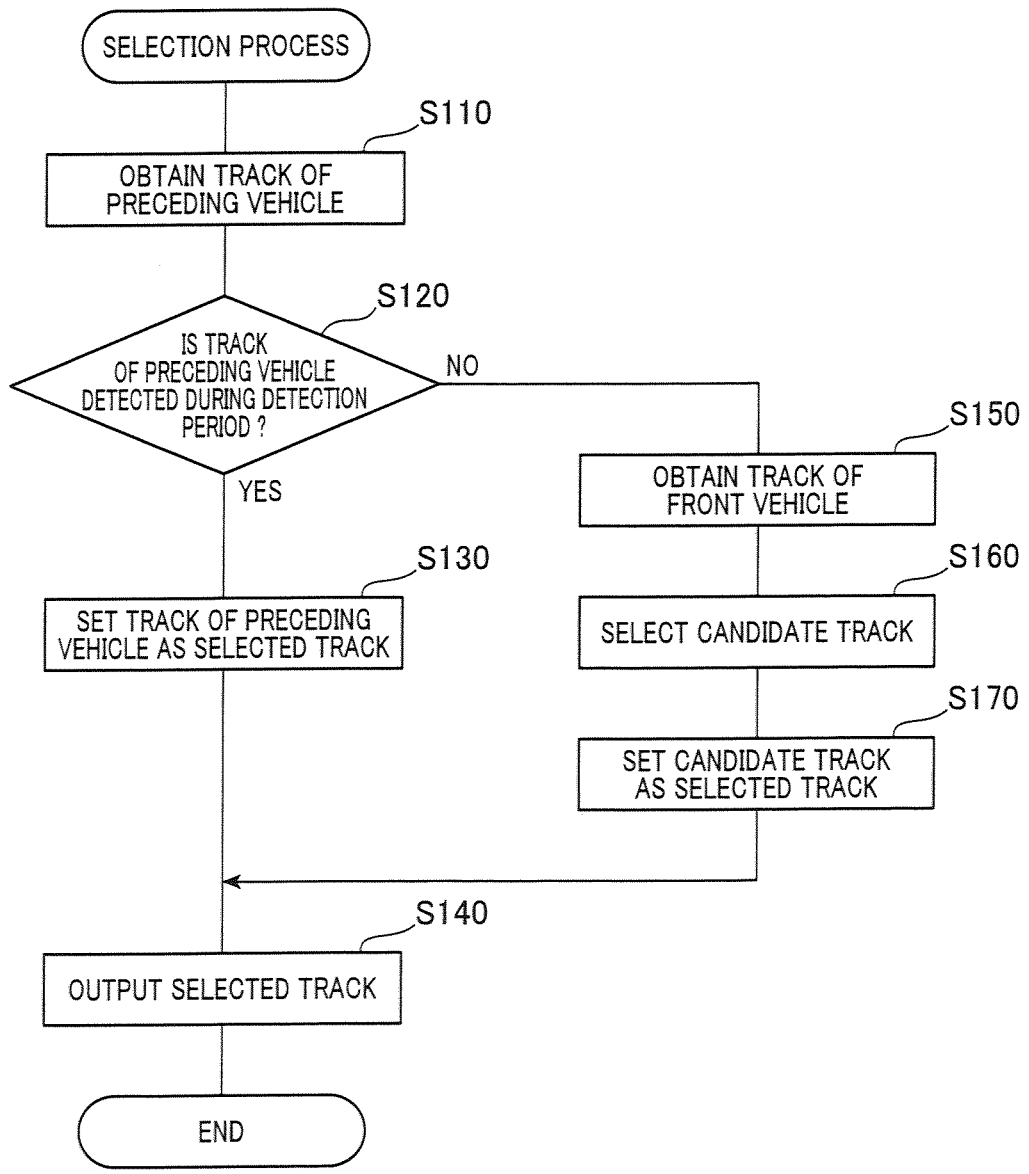

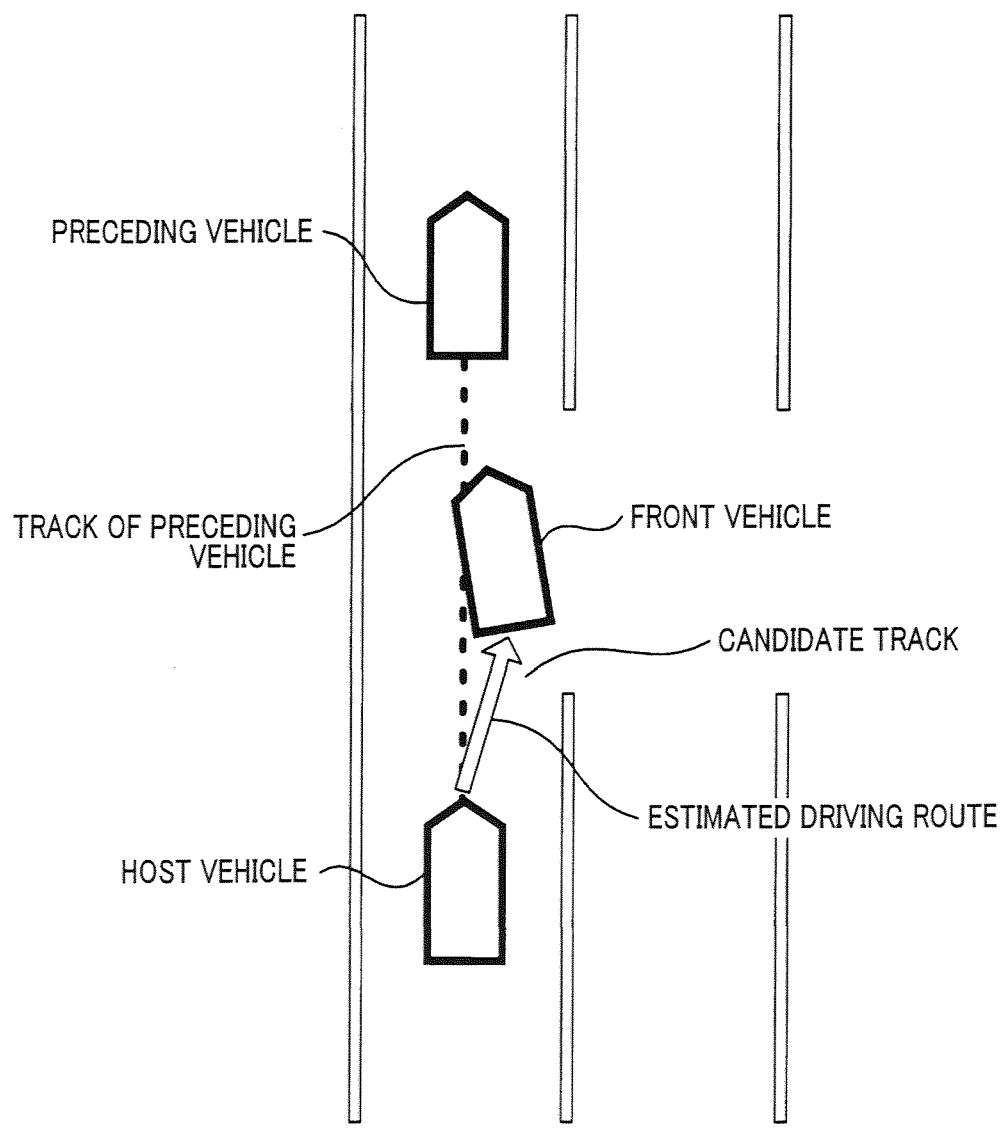

DRIVING ROUTE GENERATION DEVICE

CROSS-REFERENCE TO RELATED APPLICATION

This application is related to and claims priority from Japanese Patent Application No. 2012-279593 filed on Dec. 21, 2012, the contents of which are hereby incorporated by reference.

BACKGROUND OF THE INVENTION

1. Field of the Invention

The present invention relates to driving route generation devices for generating a driving route along which a host vehicle equipped with the driving route generation device is running by performing automatic steering.

2. Description of the Related Art

There have been known driving route generation devices for generating a driving route along which a host device equipped with a driving route generation device is running in order to follow a preceding vehicle which is running in front of the host vehicle on the same driving lane. For example, Japanese patent laid open publication No. JP 2004-78333 discloses such a type of a conventional driving route generation device.

However, the conventional driving route generation device has a problem when it generates an incorrect driving route when a detection of a track of the preceding vehicle is interrupted for some reason. For example, when another vehicle cuts between the host vehicle and the preceding vehicle, the driving route generation device of the host vehicle cannot generate a correct driving route due to the presence of another vehicle.

SUMMARY

It is therefore desired to provide a driving route generation device for generating an optimum and correct driving route along which the host vehicle can run by automatic steering regardless of environments of the host vehicle.

An exemplary embodiment provides a driving route generation device comprised of a track detection section, a selection section and an estimated driving route generation section. The track detection section detects a track of each of vehicles which are running in front of a host vehicle. The selection section selects one of the tracks detected by the track detection section and outputs the selected track. The estimated driving route generation section estimates and generates an estimated driving route of the host vehicle on the basis of the selected track selected by the selection section. The host vehicle performs automatic steering to run on the estimated driving route.

The selection section is comprised of a preceding vehicle track selection section, a candidate track section selection, and a selection track switching section. The preceding vehicle track selection section selects, as the selected track, the track of the preceding vehicle when the track of the preceding vehicle is detected by the track detection section. The preceding vehicle is running on a same driving lane of the host vehicle.

The candidate track section selection selects, as a candidate track, one of the tracks of the front vehicles other than the track of the preceding vehicle. The selection track switching section switches, as the selected track, from the track of the preceding vehicle to the candidate track when a detection of the track of the preceding vehicle is interrupted for a predetermined detection period.

The driving route generation device correctly generates an estimated driving route on the basis of the candidate track instead of the detected track of the preceding vehicle even if the detection of the track of the preceding vehicle is interrupted for some reason when the driving route generation device follows the track of the preceding vehicle. This makes it possible to provide a stable automatic steering control regardless of the environment around the host vehicle.

BRIEF DESCRIPTION OF THE DRAWINGS

A preferred, non-limiting embodiment of the present invention will be described by way of example with reference to the accompanying drawings, in which:

FIG. 2 is a view showing a detecting range of an in-vehicle camera mounted to a host vehicle which is equipped with the driving route generation device shown in FIG. 1;

FIG. 3A is a view showing an explanation of generating a track of the host vehicle;

FIG. 3B is a view showing an explanation of generating a track of a front vehicle which is running and enters in front of the host vehicle on the same driving lane of the host vehicle;

FIG. 4A is a view showing an explanation of first, second and third reference points to be used for generating an estimated driving route;

FIG. 4B is a view showing an explanation of an estimated driving route obtained by a curve approximation using the reference points;

FIG. 5 is a view showing a flow chart of performing a selection process by the driving route generation device according to the first exemplary embodiment shown in FIG. 1;

FIG. 13 is a view showing an explanation of generating an estimated driving route according to a modification of the embodiments of the present invention.

DETAILED DESCRIPTION OF THE PREFERRED EMBODIMENTS

Figure 1:
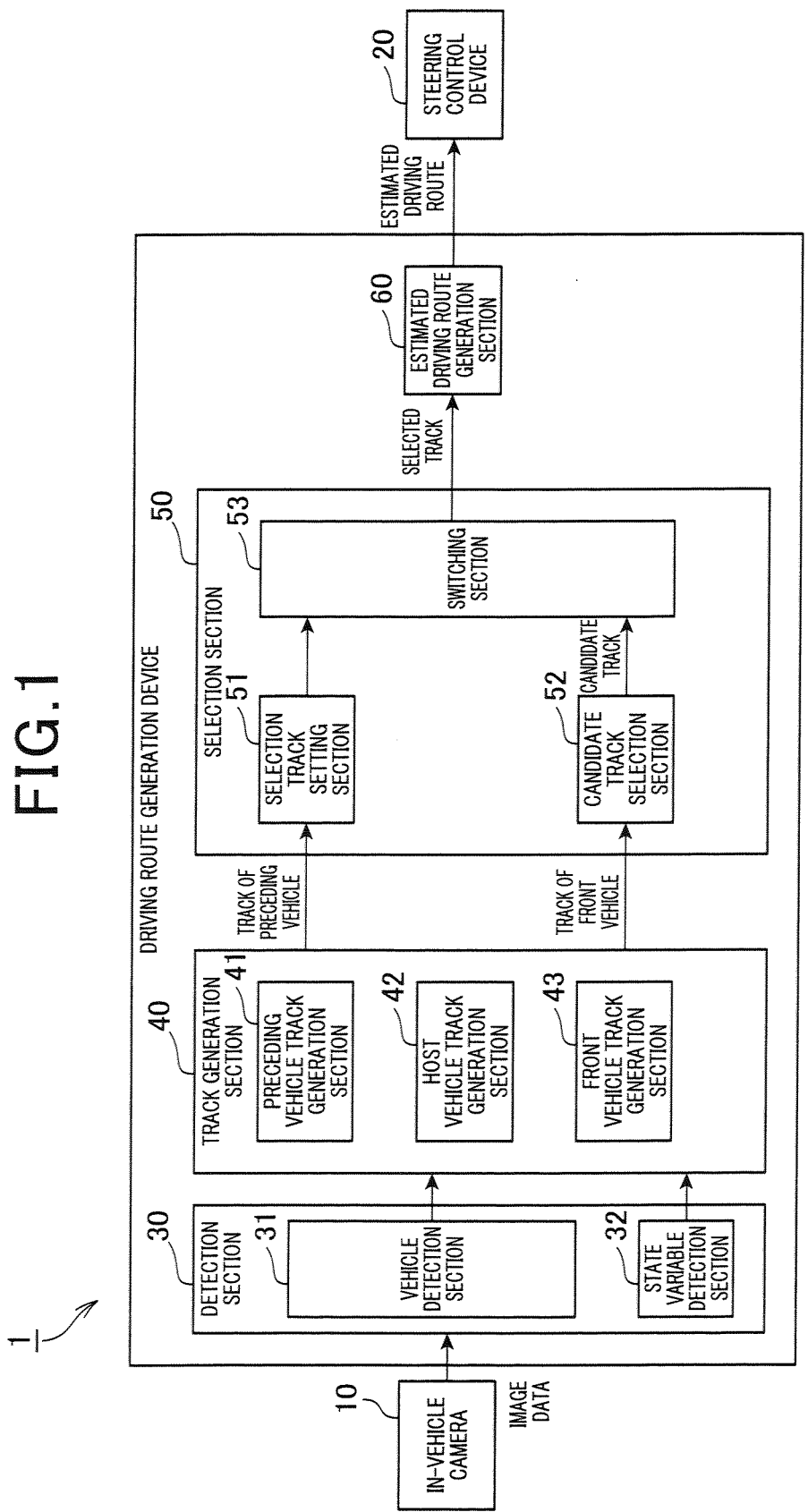
FIG. 1 is a view showing a block diagram of a driving route generation device according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a driving route generation device 1 according to a first exemplary embodiment with reference to FIG. 1 to FIG. 5.

FIG. 1 is a view showing a block diagram of the driving route generation device 1 according to the first exemplary embodiment.

[Structure]

The driving route generation device 1 is mounted to a vehicle (hereinafter, referred to as the "host vehicle") and communicated with an in-vehicle camera 10 and a steering control device 20. That is, the host vehicle is equipped with the driving route generation device 1 according to the first exemplary embodiment, the in-vehicle camera 10 and the steering control device 20. The in-vehicle camera 10 is a camera to capture a front image in a forward driving direction of the host vehicle. The in-vehicle camera 10 outputs the captured image data to the driving route generation device 1. The in-vehicle camera 10 is mounted to a front part of a rear view mirror of the host vehicle.

FIG. 2 is a view showing a detecting range of the in-vehicle camera 10 mounted to the host vehicle equipped with the driving route generation device 1 shown in FIG. 1. As shown in FIG. 2, the in-vehicle camera 10 has a detection area within a predetermined angular range centering around the forward driving direction of the host vehicle.

As shown in FIG. 1, the driving route generation device 1 generates an estimated driving route, and outputs the estimated driving route to the steering control device 20 in order to drive the host vehicle on the estimated driving route. When receiving the estimated driving route transmitted from the driving route generation device 1, the steering control device 20 generates a steering instruction on the basis of the estimated driving route, and performs the automatic steering control for the host vehicle.

The driving route generation device 1 is comprised of a detection section 30 and a track generation section 40. The detection section 30 detects state variables of a surrounding of the host vehicle and state variables of the host vehicle on the basis of the captured image data. The track generation section 40 generates a track of the preceding vehicle and a track of each of front vehicles on the basis of the detection results of the detection section 30. The driving route generation device 1 is further comprised of a selection section 50 and an estimated driving route generation section 60. The selection section 50 selects one of the track of the preceding vehicle and the track of the front vehicle, and outputs the selected track as the selected track. When receiving the selected track transmitted from the selection section 50, the estimated driving route generation section 60 generates the estimated driving route.

The detection section 30 is comprised of a vehicle detection section 31 and a state variable detection section 32. The vehicle detection section 31 detects a position of the host vehicle and a position of the preceding vehicle on the basis of the captured image data every a predetermined detection period (this detection period is designated by T1) by using a known method. The state variable detection section 32 detects state variables which indicate the driving state of the host vehicle.

The vehicle detection section 31 recognizes, as a preceding vehicle, a vehicle which is running in front of the host vehicle on the same driving lane of the host vehicle. Other vehicles which are running in front of the host vehicle other than the preceding vehicle are referred to as the "front vehicles".

The vehicle detection section 31 outputs the position information which contains the position of the host vehicle, the position of the preceding vehicle and the position of the front vehicles. The front vehicles are vehicles which are running in front of the host vehicle, other than the preceding vehicle.

On the other hand, the state variable detection section 32 detects at least the vehicle speed of the host vehicle and the angle of yaw of the host vehicle and outputs the detected values as the state variables of the host vehicle to the track generation section 40.

The track generation section 40 is comprised of a preceding vehicle track generation section 41, a host vehicle track generation section 42 and a front vehicle track generation section 43. The preceding vehicle track generation section 41 generates a track of the preceding vehicle. The host vehicle track generation section 42 generates a track of the host vehicle. The track of each of those vehicles is detected by a known method. Because the track of the preceding vehicle and the track of the front vehicles are generated by the same method, the following description will explain how to generate the track of the host vehicle and the track of the preceding vehicle.

The host vehicle track generation section 42 generates the track of the host vehicle on the basis of position information of the host vehicle stored in a memory section (not shown) obtained from a previous detection cycle and position information of the host vehicle in a current detection cycle.

FIG. 3A is a view showing an explanation of generating a track of the host vehicle. FIG. 3B is a view showing an explanation of generating a track of the front vehicle which is running and enters in front of the host vehicle on the same driving lane of the host vehicle.

Specifically, as shown in FIG. 3A, the host vehicle track generation section 42 calculates a travel distance D during a period from a previous detection cycle to a current detection period (as a detection period T1) by using a vehicle speed detected in the current detection cycle.

Next, the host vehicle track generation section 42 calculates a variation X and a variation Y in the position of the host vehicle in a current x-y coordinate system by using the calculated travel distance D and the angle of yaw detected in the current detection cycle by the following equations (1) and (2), where the variation X and the variation Y are variations in the detection position of the host vehicle from the previous detection cycle to the current detection cycle.

$$X = D \cdot \cos \theta \quad (1), \text{ and}$$

$$Y = D \cdot \sin \theta \quad (2).$$

The host vehicle track generation section 42 calculates the detection positions (X1, Y1) of the host vehicle in the previous detection cycles in the current x-y coordinate system on the basis of the detection position in the current detection cycle as the origin of the current x-y coordinate system. Similarly, the host vehicle track generation section 42 calculates the detection positions (X2, Y2), . . . , and (Xi, Yi) (i is zero or a positive integer) in the current x-y coordinate system in the detection cycles before the last detection cycle. The host vehicle track generation section 42 generates the trace of the detection position of the host vehicle in these detection cycles as the trace of the host vehicle.

The front vehicle track generation section 43 generates the driving track of the front vehicle on the basis of the position information of the front vehicle transmitted from the detection section 30 and the track of the host vehicle generated by the host vehicle track generation section 42. Specifically, as shown in FIG. 3B, the front vehicle track generation section 43 calculates the detection position of the front vehicle as the deviation (Δx0, Δy0) of the front vehicle in the current x-y coordinate system. The deviation (Δx0, Δy0) of the front vehicle in the current x-y coordinate system is stored in the memory section (not shown). That is, the store section stores the deviation (Δx0, Δy0) of the front vehicle (i is zero and a positive integer) as a difference between the detection position of the host vehicle and the detection position of the front vehicle in the detection cycle.

The front vehicle track generation section 43 calculates the detection position (xi, yi) of the front vehicle in the current x-y coordinate system in each detection cycle by using the deviation (Δxi, Δyi) of the front vehicle and the detection position (Xi, Yi) of the host vehicle according to the equations (3) and (4).

$$xi = Xi + \Delta xi \quad (3), \text{ and}$$

$$yi = Yi + \Delta yi \quad (4).$$

The selection section 50 is comprised of a selection track setting section 51, a candidate track selection section 52 and a switching section 53. The selection track setting section 51 sets a track of the preceding vehicle as a selected track when the track of the preceding vehicle is detected. The selection track setting section 51 outputs the selected track to the switching section 53. The candidate track selection section 52 selects one of tracks of the front vehicle transmitted from the track generation section 40, and outputs the selected track of the front vehicle as the candidate track to the switching section 53. The switching section 53 switches the track of the preceding vehicle to the candidate track when the track of the preceding vehicle is not detected over a predetermined detection period, and outputs the obtained track to the estimated driving route generation section 60.

That is, the switching section 53 in the selection section 50 outputs the track of the preceding vehicle to the estimated driving route generation section 60 while the detection section 30 detects the presence of the preceding vehicle. On the other hand, the switching section 53 outputs the candidate track as the selected track to the estimated driving route generation section 60 while the detection section 30 does not detect the presence of the preceding vehicle.

When receiving a plurality of tracks of the front vehicle transmitted form the track generation section 40 (the front vehicle track generation section 43), the candidate track selection section 52 selects and outputs the candidate track having a highest degree of coincidence with the track of the preceding vehicle. Specifically, the track having the highest degree of coincidence with the preceding vehicle is a smallest distance between the detection position of the host vehicle and the track of the front vehicle in a width direction of the driving lane on which the host vehicle is running during the current detection cycle.

The estimated driving route generation section 60 generates an estimated driving route by using the selected track transmitted from the selection section 50, and outputs the obtained estimated driving route to the steering control device 20. Because there are many methods of generating such an estimated driving route, one of these methods will be explained.

FIG. 4A is a view showing an explanation of first, second and third reference points to be used for generating an estimated driving route. FIG. 4B is a view showing an explanation of an estimated driving route obtained by a curve approximation using the reference points.

As shown in FIG. 4A, a first reference point is set on the forward moving direction of the host vehicle, and a second reference point is set, which is on the selected track and far from the first reference point and the current position of the host vehicle. Further, a third reference point is set on the position of the front vehicle corresponding to the selected track (for example, on the center section of a rear bumper of the front vehicle).

The estimated driving route generation section 60 generates an estimated driving route, as shown in FIG. 4B, on the basis of the first reference point, the second reference point and the third reference point by using a spline interpolation.

[Processing]

In this exemplary embodiment, the driving route generation device 1 is comprised of a microcomputer and peripheral devices. The microcomputer is comprised of the CPU, the ROM and the RAM, as previously described. The driving route generation device 1 performs at least the process of generating an estimated driving route of the host vehicle. It is known for the detection section 30 to perform the process of detecting the position of vehicles and of detecting state variables of the host vehicle, and it is also known for the estimated driving route generation section 60 to generate the estimated driving route. Accordingly, a description will now be given of the selection process performed by the selection section 50 with reference to the flow chart shown in FIG. 5.

FIG. 5 is a view showing a flow chart of performing the selection process by the driving route generation device 1 according to the first exemplary embodiment shown in FIG. 1.

The routine designated by the flow chart shown in FIG. 5 is started every time which corresponds to the detection cycle of the detection section 30. When starting the routine shown in FIG. 5, the selection section 50 obtains the trace of the preceding vehicle generated by the preceding vehicle track generation section 41 in step S110. The operation flow goes to step S120.

In step S120, the selection section 50 judges whether or not the track of the preceding vehicle is detected during a predetermined period (as the detection period). When the judgment result in step S120 indicates affirmation ("Y" in step S120) i.e. when the detection of the track of the preceding vehicle is correctly continued during the predetermined period, the operation flow goes to step S130. In step S130, the selection section 50 sets the track of the preceding vehicle as the selected track. The operation flow goes to step S140. The selection section 50 outputs the selected track to the estimated driving route generation section 60. The selection section 50 completes the routine indicated by the flow chart shown in FIG. 5.

On the other hand, when the judgment result in step S120 indicates negation ("N" in step S120), i.e. when the detection of the track of the preceding vehicle is interrupted during the predetermined period, the operation flow goes to step S150. In step S150, the candidate track selection section 52 in the selection section 50 receives the track of the front vehicle transmitted from the front vehicle track generation section 43. The operation flow goes to step S160. In step S160, the switching section 53 in the selection section 50 selects, as the candidate track, the track having a highest degree of coincidence with the track of the preceding vehicle in the tracks of the front vehicles obtained in step S150. The operation flow goes to step S170. In step S170, the selection section 50 sets, as the selected track, the candidate track selected in step S160. The operation flow goes to step S140. In step S140, the selection section 50 outputs the selected track to the estimated driving route generation section 60. The selection section 50 completes the routine shown in FIG. 5.

[Effects]

As previously described, the driving route generation device 1 according to the first exemplary embodiment generates an estimated driving route by using the candidate track as one of the tracks of front vehicles instead of using the track of the preceding vehicle even if the driving route generation device 1 pursues the preceding vehicle and then interrupts the detection of the track of the preceding vehicle.

There is some reason to interrupt the detection of the preceding vehicle. For example, there are some cases when another vehicle cuts between the host vehicle and the preceding vehicle or when the weather is bad, for example, storm, snow, fog, etc.

It is possible for the driving route generation device 1 according to the first exemplary embodiment to perform the stable automatic steering regardless of environments around the host vehicle which is running on the driving lane. In addition, because the driving route generation device 1 according to the first exemplary embodiment generates an estimated driving track having a curve, it is possible to suppress occurrence of uncomfortable driving in passengers of the host vehicle.

The detection section 30 and the track generation section 40 correspond to the track detection section used in the claims, and the selection section 50 corresponds to the selection section used in the claims. Further, the estimated driving route generation section 60 corresponds to the estimated driving route generation section used in the claims. The selection track setting section 51 corresponds to the preceding vehicle track selection section used in the claims. The candidate track selection section 52 corresponds to the candidate track selection section used in the claims. The switching section 53 corresponds to the selection track switching section used in the claims.

Second Exemplary Embodiment

A description will be given of a driving route generation device 2 according to a second exemplary embodiment with reference to FIG. 6, FIG. 7 and FIG. 8.

Figure 6:
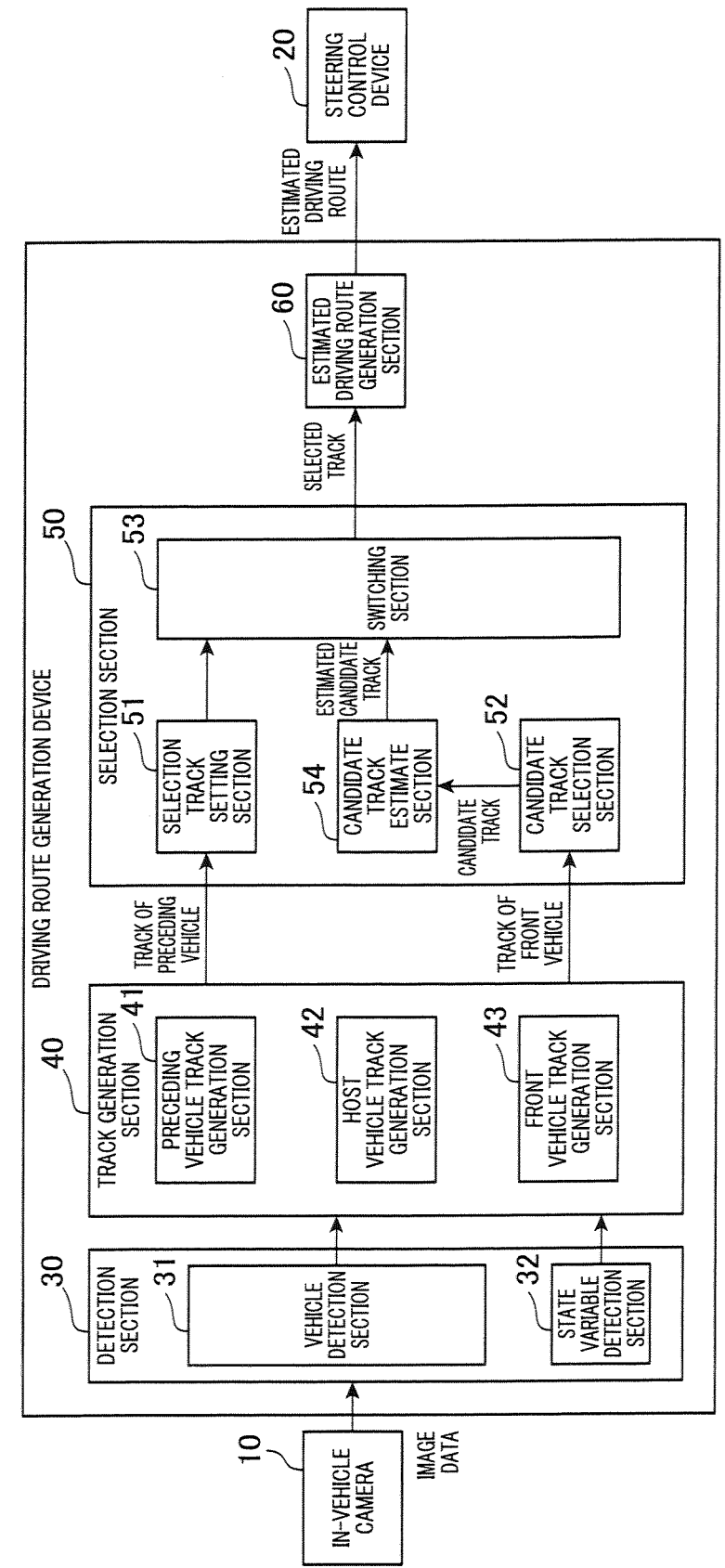
FIG. 6 is a view showing a block diagram of a driving route generation device according to a second exemplary embodiment of the present invention.

FIG. 6 is a view showing a block diagram of the driving route generation device 2 according to the second exemplary embodiment. FIG. 7 is a view showing a flow chart of performing the selection process by the driving route generation device 2 according to the second exemplary embodiment shown in FIG. 1.

[Structure]

The following description will explain a difference between the driving route generation device 2 according to the second exemplary embodiment and the driving route generation device 1 according to the first exemplary embodiment.

As shown in FIG. 6, in the structure of the driving route generation device 2 according to the second exemplary embodiment, the selection section 50 has a candidate track estimate section 54. The candidate track estimate section 54 receives the candidate track transmitted from the candidate track selection section 52, and generates an estimated track during a predetermined period on the basis of the received candidate track, and generates an estimated candidate track on the basis of the estimated track and the candidate track, and outputs the generated estimated candidate track. As shown in FIG. 6, the switching section 53 receives the estimated candidate track, instead of the candidate track (see FIG. 1). When the detection of the track of the preceding vehicle is interrupted for some reason, the switching section 53 outputs the estimated candidate track instead of the track of the preceding vehicle.

Figure 7:
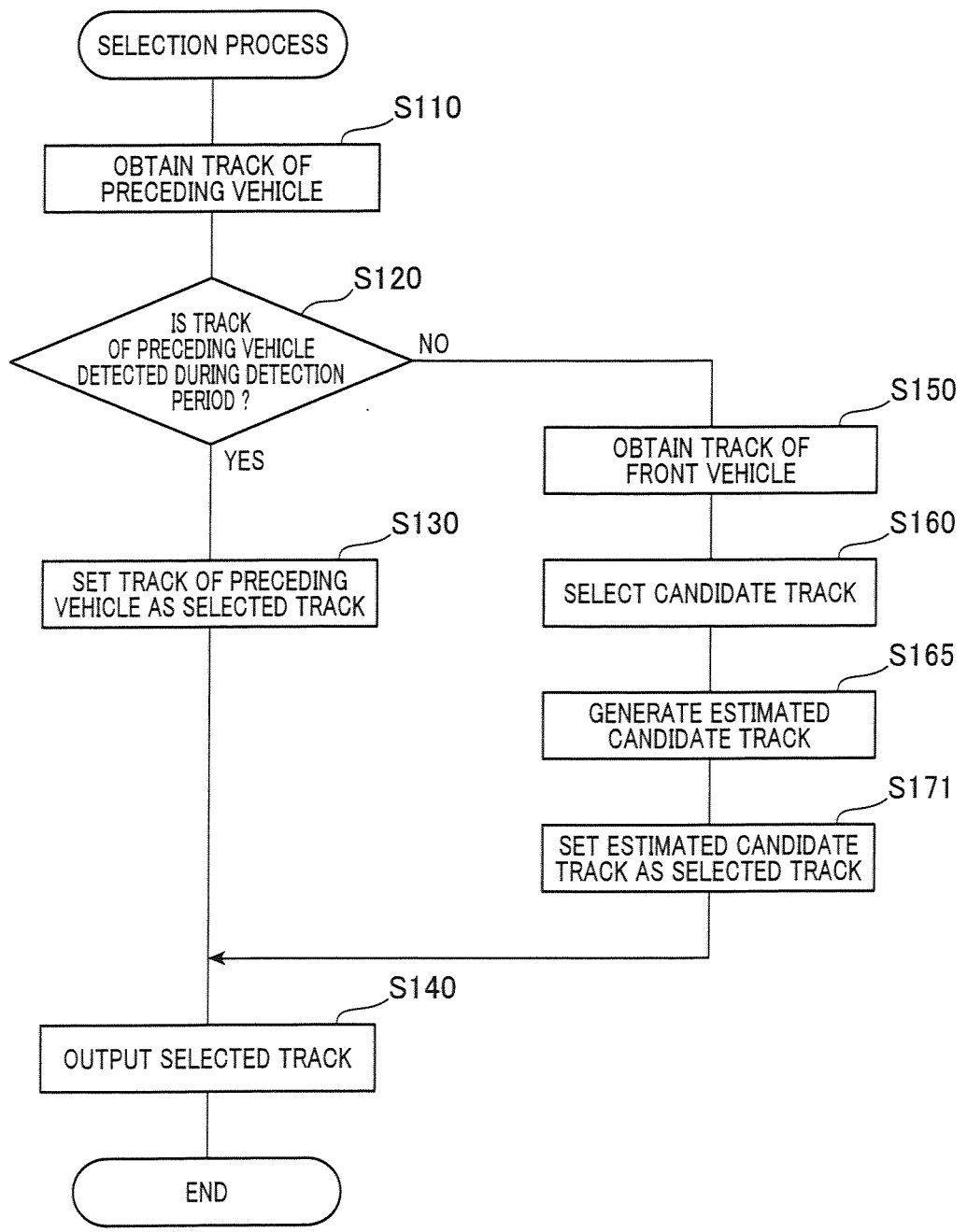
FIG. 7 is a view showing a flow chart of performing a selection process by the driving route generation device according to the second exemplary embodiment shown in FIG. 1.

When compared with the routine shown in FIG. 4, a process in step S165 is added to, and a process in step S171 is replaced with the process in steps S170 in the selection process shown in FIG. 7 performed by the driving route generation device 2 according to the second exemplary embodiment. That is, after performing the process in step S160, the candidate track estimate section 54 in the selection section 50 generates the estimated candidate track. The candidate track estimate section 54 outputs the estimated candidate track in step S171, instead of outputting the candidate track in step S170.

[Effects]

As previously described, driving route generation device 2 according to the second exemplary embodiment generates and outputs the estimated driving route on the basis of the estimated candidate track, instead of the track of the preceding vehicle, when the detection of the track of the preceding vehicle is interrupted for some reason.

Figure 8:
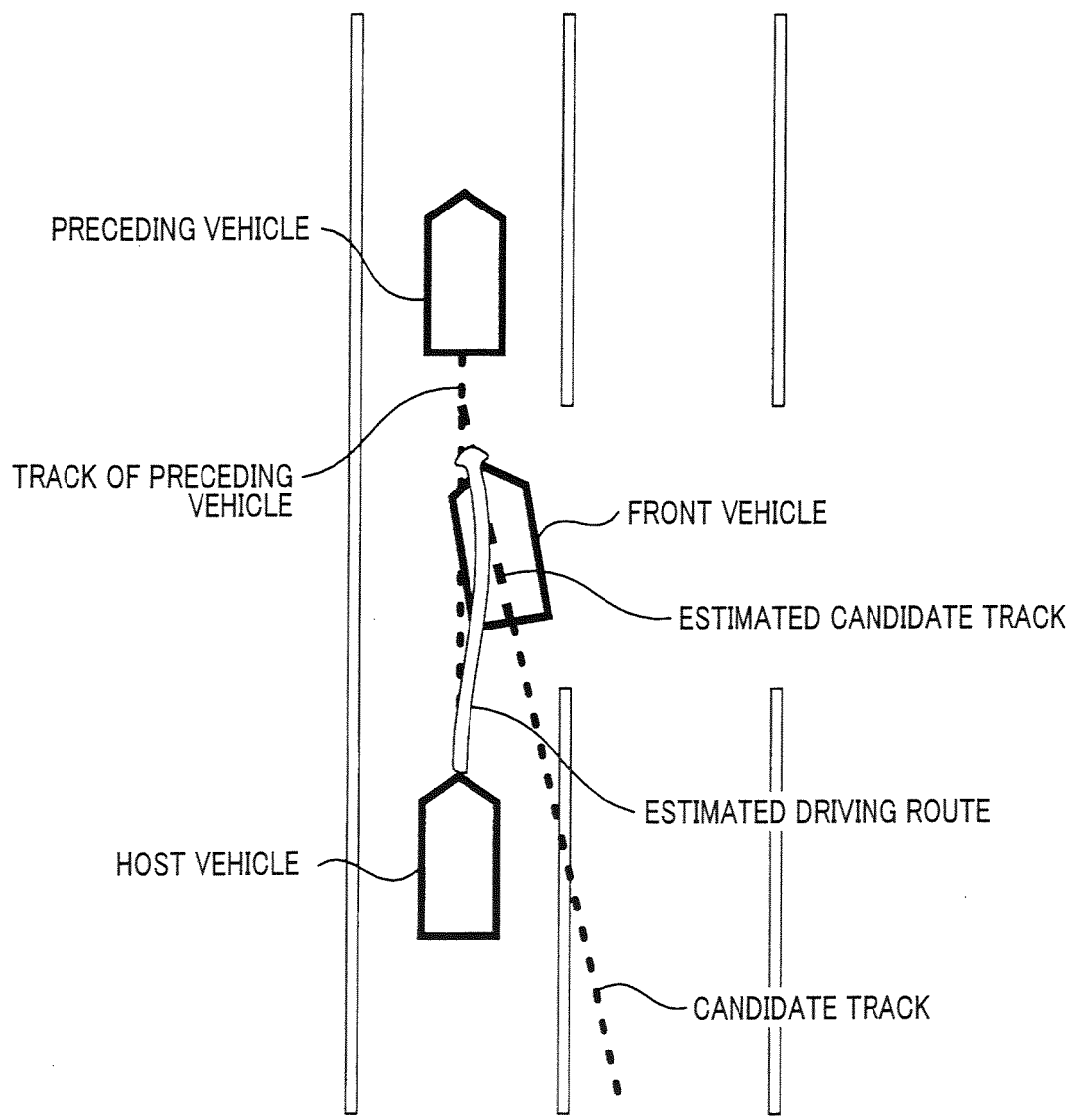
FIG. 8 is a view showing an estimated driving route of the host vehicle generated by using an estimated candidate track.

FIG. 8 is a view showing an estimated driving route of the host vehicle generated by using an estimated candidate track. As shown in FIG. 8, the estimated driving route generation section 60 does not generate the estimated driving route on the basis of the detection position of the front vehicle in the current detection cycle. The candidate track estimate section 54 generates an estimated candidate track, and the estimated driving route generation section 60 generates the estimated driving route on the basis of the generated estimated candidate track and a target position which is in front of the detection position of the front vehicle in the current detection cycle. This makes it possible to perform the stable automatic steering of the host vehicle because of suppressing a sudden steering control.

Third Exemplary Embodiment

A description will be given of a driving route generation device 3 according to a third exemplary embodiment with reference to FIG. 9, FIG. 10 and FIG. 11.

[Structure]

The following description will explain a difference between the driving route generation device 3 according to the third exemplary embodiment and the driving route generation device 2 according to the second exemplary embodiment.

Figure 9:
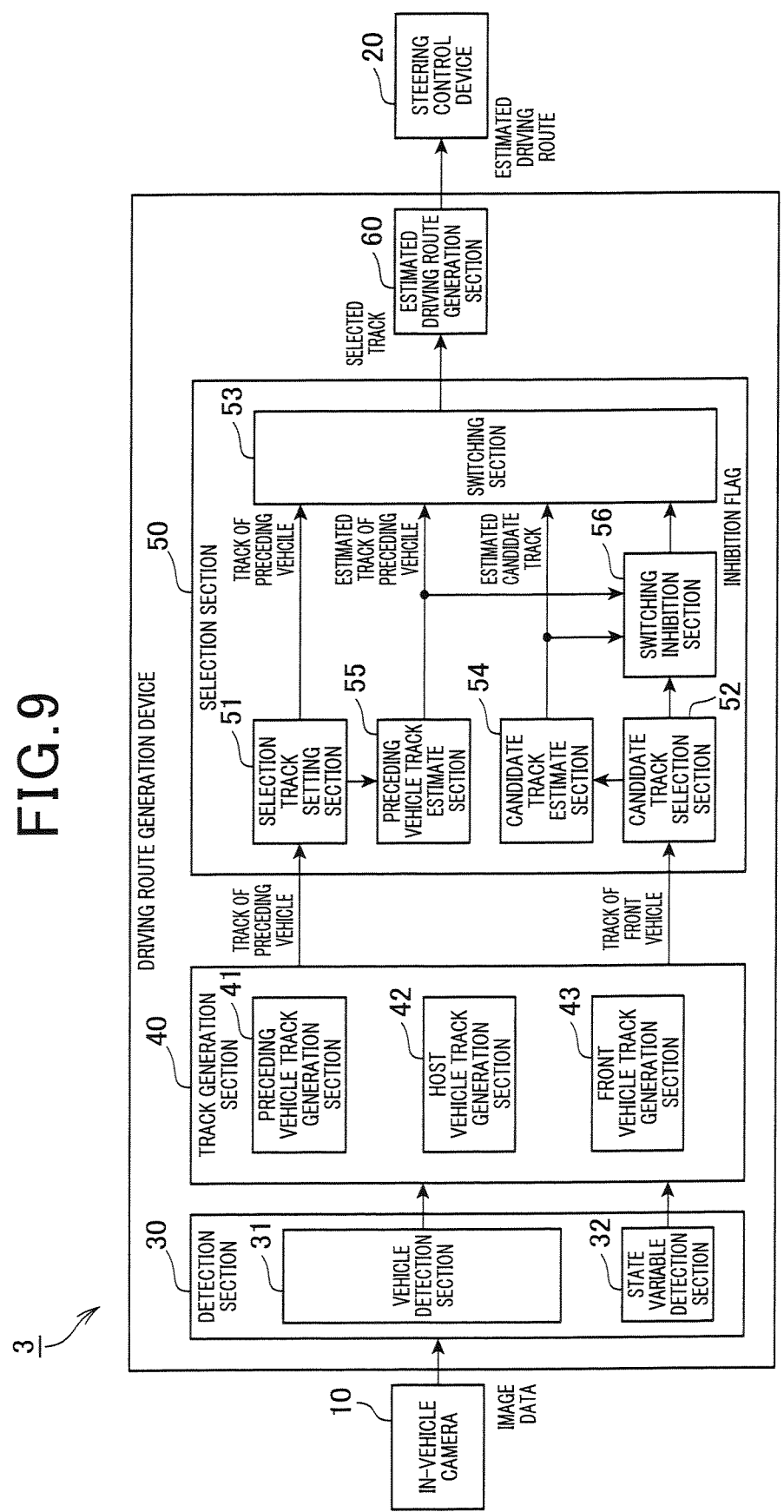
FIG. 9 is a view showing a block diagram of a driving route generation device according to a third exemplary embodiment of the present invention.

FIG. 9 is a view showing a block diagram of a driving route generation device 3 according to the third exemplary embodiment of the present invention.

When compared with the structure of the selection section 50 in the second exemplary embodiment, a preceding vehicle track estimate section 55 and a switching inhibition section 56 are added to the selection section 50 in the third exemplary embodiment shown in FIG. 9.

The preceding vehicle track estimate section 55 generates an estimated track during a predetermined period for the track of the preceding vehicle transmitted from the selection track setting section 51. The preceding vehicle track estimate section 55 further generates an estimated track of the preceding vehicle on the basis of the generated estimated track and the received track of the preceding vehicle. The preceding vehicle track estimate section 55 outputs the generated estimated track of the preceding vehicle to the switching section 53.

The switching inhibition section 56 receives the estimated track of the preceding vehicle transmitted from the preceding vehicle track generation section 41 and the estimated candidate track transmitted from the candidate track estimate section 54, and sets a predetermined value to an inhibition flag when the estimated candidate track approaches the estimated track of the preceding vehicle. That is, in a case when it is predicted that the estimated candidate track crosses the estimated track of the preceding vehicle after the estimated candidate track approaches the estimated track of the preceding vehicle, the switching inhibition section 56 outputs the inhibition flag.

Figure 10:
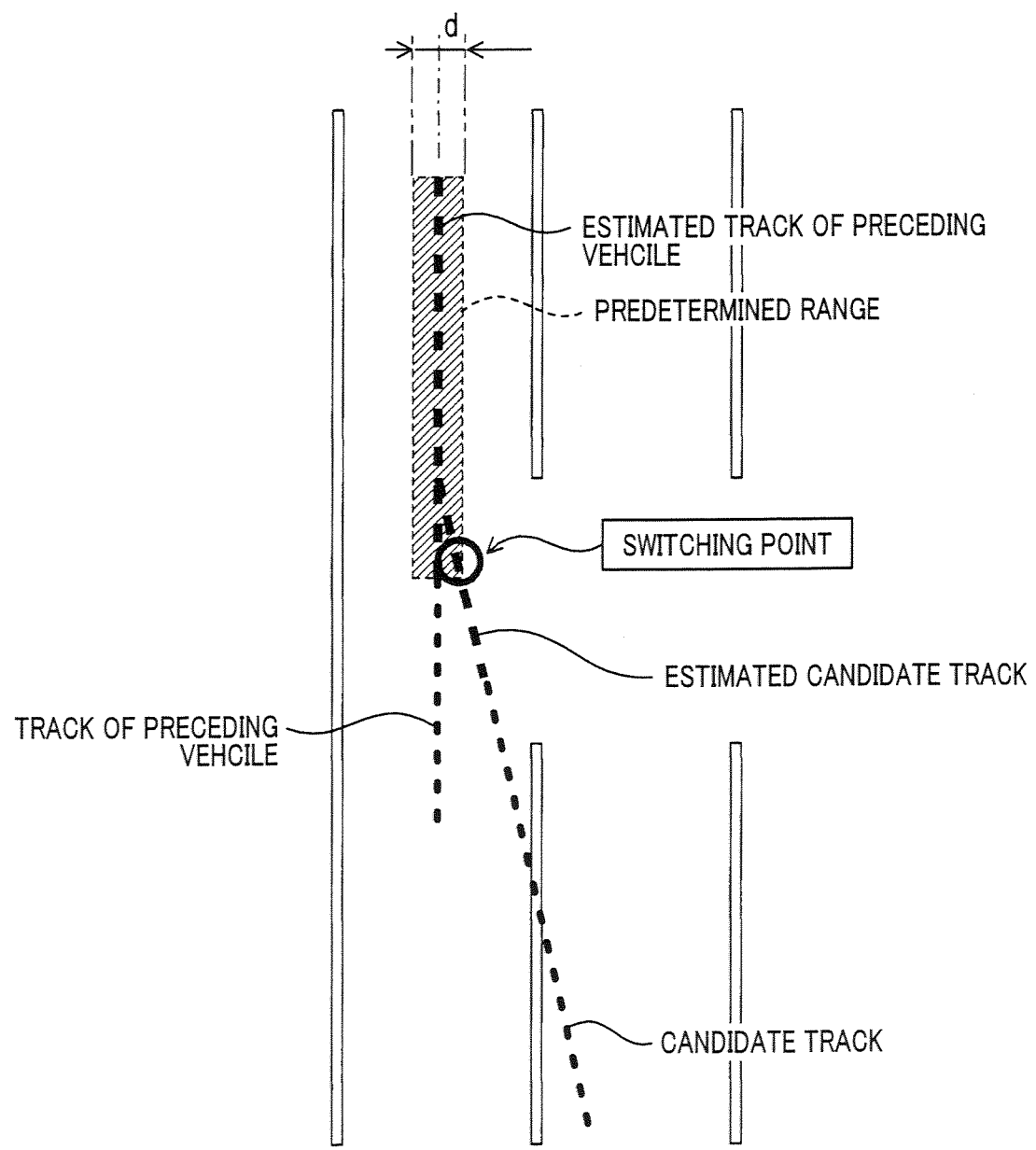
FIG. 10 is a view showing a case in which an estimated candidate track approaches an estimated track of the preceding vehicle.

FIG. 10 is a view showing a case in which the estimated candidate track approaches the estimated track of the preceding vehicle. As shown in FIG. 10, crossing of the estimated candidate track with the estimated track of the preceding vehicle indicates a case in which the estimated candidate track is present within a predetermined range having a predetermined width d around the estimated track of the preceding vehicle in a width direction of the driving lane of the host vehicle.

The switching section 53 in the selection section 53 according to the third exemplary embodiment shown in FIG. 9 receives the estimated track of the preceding vehicle transmitted from the preceding vehicle track estimate section 55 in addition to the track of the preceding vehicle transmitted from the selection track setting section 51 and the estimated candidate track of the front vehicle transmitted from the candidate track estimate section 54, like the second embodiment shown in FIG. 6. The switching section 53 outputs the estimated candidate track instead of the track of the preceding vehicle when the detection of the track of the preceding vehicle is interrupted and the inhibition flag does not have the predetermined value. On the other hand, the switching section 53 outputs the estimated track of the preceding vehicle when the detection of the track of the preceding vehicle is interrupted and the inhibition flag has the predetermined value.

Figure 11:
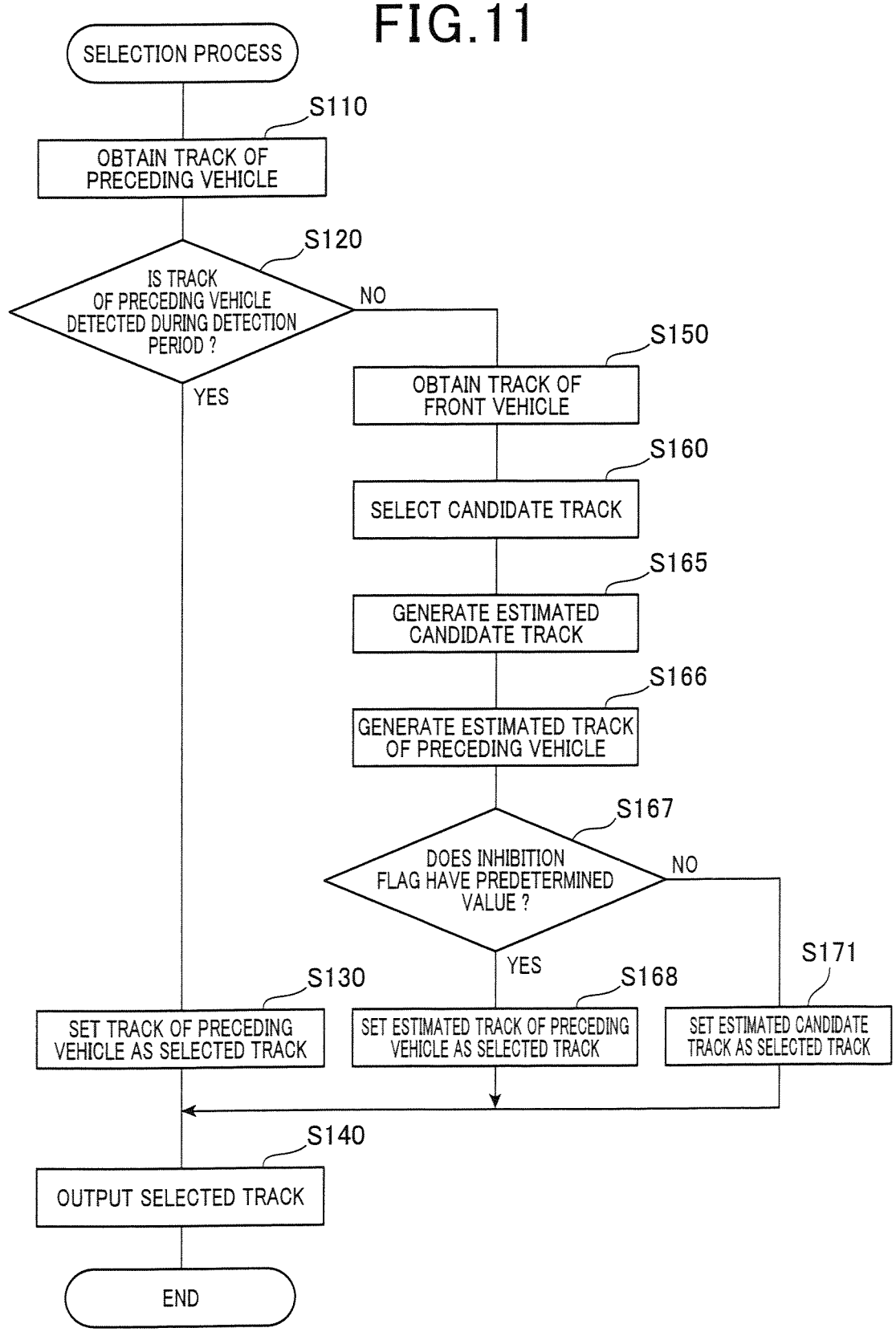
FIG. 11 is a view showing a flow chart of a selection process performed by the driving route generation device according to the third exemplary embodiment shown in FIG. 9.

FIG. 11 is a view showing a flow chart of the selection process performed by the driving route generation device 3 according to the third exemplary embodiment shown in FIG. 9.

When compared with the routine shown in FIG. 7, processes in step S166 to 5168 are added to the selection process according to the third exemplary embodiment as shown in FIG. 11. That is, the preceding vehicle track estimate section 55 generates the estimated track of the preceding vehicle in step S166 after the process in step S165. The switching section 53 detects whether or not the inhibition flag has the predetermined value in step S167. When the detection result in step S167 indicates negation ("N" in step S167), the operation flow goes to step S171. In step S171, the switching section 53 selects the estimated candidate track as the selected track. The operation flow goes to step S140.

On the other hand, when the detection result obtained in step S167 indicates affirmation ("Y" in step S167), the operation flow goes to step S168. In step S168, the switching section 53 selects the estimated track of the preceding vehicle as the selected track. The operation flow goes to step S140. In step S140, the switching section 53 outputs the selected track to the estimated driving route generation section 60. The routine indicated by the flow chart shown in FIG. 11 is completed.

[Effects]

As previously described, the driving route generation device 3 according to the third exemplary embodiment generates the estimated driving route to follow the estimated route of the track of the preceding vehicle when the candidate track approaches the track of the preceding vehicle even if the detection of the track of the preceding vehicle is interrupted for some reason. This makes it possible to suppress unnecessary steering control, and to perform a stable automatic steering control.

Figure 12:
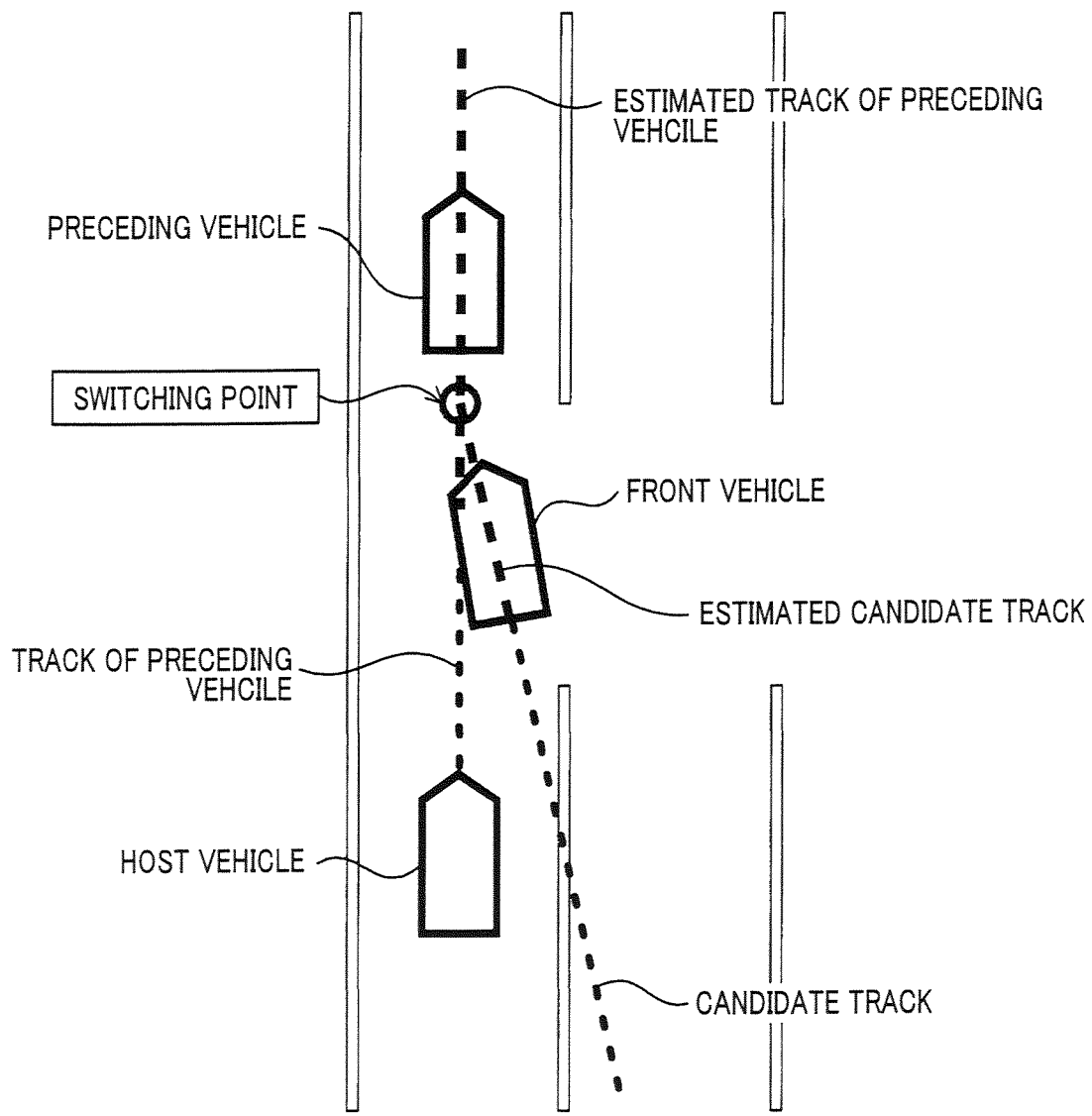
FIG. 12 is a view showing an explanation of an estimated candidate track of the front vehicle which crosses to an estimated track of the preceding vehicle.

FIG. 12 is a view showing an explanation of the estimated candidate track of the front vehicle which crosses to the estimated track of the preceding vehicle.

Furthermore, in the structure of the driving route generation device 3 according to the third exemplary embodiment, it is possible to switch the candidate vehicle to the preceding vehicle (see the switching point shown in each of FIG. 10 and FIG. 12) when the front vehicle (hereinafter, referred to as the "candidate vehicle") which corresponds to the candidate track approaches within a predetermined distance, or when the estimated candidate route is overlapped with the estimated track of the preceding vehicle. This makes it possible to certainly follow the vehicle which is running directly in front of the host vehicle.

The switching inhibition section 56 used in the third exemplary embodiment corresponds to the switching inhibition section used in the claims.

[Various Modifications]

The concept of the present invention is not limited by the first, second and third exemplary embodiments previously described. It is possible to apply the concept of the present invention to various modifications without limiting the scope of the present invention.

(a) FIG. 13 is a view showing an explanation of generating an estimated driving route according to a modification of the embodiments of the present invention. In the exemplary embodiments previously described, the driving route generation device generates an estimated driving route on the basis of the candidate track which is one of the tracks of front vehicles when the detection of the track of the preceding vehicle is interrupted for some reason. Instead of this, as shown in FIG. 13, it is possible to recognize, as the target vehicle, the front vehicle which is closest to the host vehicle in the current detection cycle. Further, it is possible to generate the estimated driving route by connecting the detection position of the target vehicle to the detection position of the host vehicle (in a concrete case, the detection position is a center part, etc. of the rear bumper of the front vehicle).

Because this uses the detection position as the latest track in the current detection cycle, it is possible to eliminate the process of generating the candidate track by using the detection position obtained until the previous detection cycle. It is possible to recognize, as the target vehicle, the vehicle which is closest to the host vehicle in front vehicles which are running along the driving lane of the host vehicle at a position apart from a predetermined distance from the host vehicle in a width direction of the driving lane of the host vehicle.

(b) In the exemplary embodiments previously described, the driving route generation device generates a track of the host vehicle, a track of the preceding vehicle, and a track of the front vehicle on the basis of the image data captured by the in-vehicle camera 1. However, the concept of the present invention is not limited by the exemplary embodiments. For example, it is possible to generate the tracks of the host vehicle, the preceding vehicle and the front vehicle by using a millimeter wave radar or a laser radar device. Still further, it is also possible to generate the tracks of the tracks of the host vehicle, the preceding vehicle and the front vehicle on the basis of a current position and map data through GPS information obtained by a navigation device which is mounted to the host vehicle. When using a navigation device, because the driving route generation device according to the exemplary embodiments recognizes the current position of the host vehicle and a shape of a front driving route by using map data stored in the memory section, it is possible for the preceding vehicle track estimate section 55 to increase the accuracy of estimating the estimated track of the preceding vehicle by using the map data stored in the navigation device.

(c) In the third exemplary embodiment previously described, the driving route generation device generates an estimated track of the preceding vehicle when the detection of the track of the preceding vehicle is interrupted for some reason. Further, when the estimated candidate track approaches the estimated track of the preceding vehicle, the driving route generation device generates the estimated driving route on the basis of the estimated track of the preceding vehicle. The concept of the present invention is not limited by this. For example, when the detection of the track of the preceding vehicle is interrupted for some reason and the estimated candidate track suddenly appears and cuts in front of the host vehicle, it is possible to avoid generation of the estimated track of the preceding vehicle and to generate the estimated driving route by using the track of the preceding vehicle stored in the memory section instead.

(d) In the exemplary embodiments previously described, the driving route generation device generates the estimated driving route by using a spline interpolation. The concept of the present invention is not limited by this. For example, it is possible to generate the estimated driving route of the host vehicle by directly connecting the detection position of the host vehicle to the latest candidate track of the front vehicle (that is, the detection position of the front vehicle in the current detection cycle which is running on the candidate track).

(e) It is possible to use one selected from hardware devices, software programs and a combination of the hardware devices and software programs in order to form the components in the driving route generation devices 1, 2 and 3 and the modifications thereof according to the first, second and third exemplary embodiments previously described. For example, it is possible to form a part of the driving route generation devices 1, 2 and 3 by using a microcomputer which performs the programs designated by the routines indicated by the flow charts, as previously described. It is possible to form a part or all of the functions of the components functionally, physically, separately or integrally.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A driving route generation device comprises:
a track detection section configured to detect a track of each of a plurality of vehicles which are running in front of a host vehicle;
a selection section configured to select one of the tracks detected by the track detection section and output the selected track, the selection section comprising:
  a preceding vehicle track selection section configured to select, as the selected track, the track of the preceding vehicle when the track of the preceding vehicle, which is running on a same driving lane of the host vehicle, is detected by the track detection section;
  a candidate track selection section configured to select, as a candidate track, one of the tracks of the front vehicles other than the track of the preceding vehicle; and
  a selection track switching section configured to switch, as the selected track, from the track of the preceding vehicle to the candidate track when a detection of the track of the preceding vehicle is interrupted for a predetermined detection period, and
an estimated driving route generation section configured to generate an estimated driving route of the host vehicle on the basis of the selected track selected by the selection section, wherein the host vehicle performs automatic steering to run on the estimated driving route; wherein when there are a plurality of the front vehicles, the selection track switching section in the selection section selects, as the candidate track, one of the tracks of the front vehicles which is closest to the track of the preceding vehicle.

2. The driving route generation device according to claim 1, wherein the estimated driving route generation section generates, as the estimated driving route of the host vehicle, a curved route which asymptotically approaches the selected track when the selected track is the track of the preceding vehicle.

3. The driving route generation device according to claim 2, wherein the selection section further comprises a switching inhibition section configured to inhibit the selection track switching section from performing the switching of the selected track when the candidate track has a shape which approaches the track of the preceding vehicle.

4. The driving route generation device according to claim 1, wherein the selection section further comprises a switching inhibition section configured to inhibit the selection track switching section from performing the switching of the selected track when the candidate track has a shape which approaches the track of the preceding vehicle.

* * * * *